(No Model.)
C. J. MORRISON.
COMBINED COTTON SCRAPER AND CHOPPER.
No. 298,491. Patented May 13, 1884.
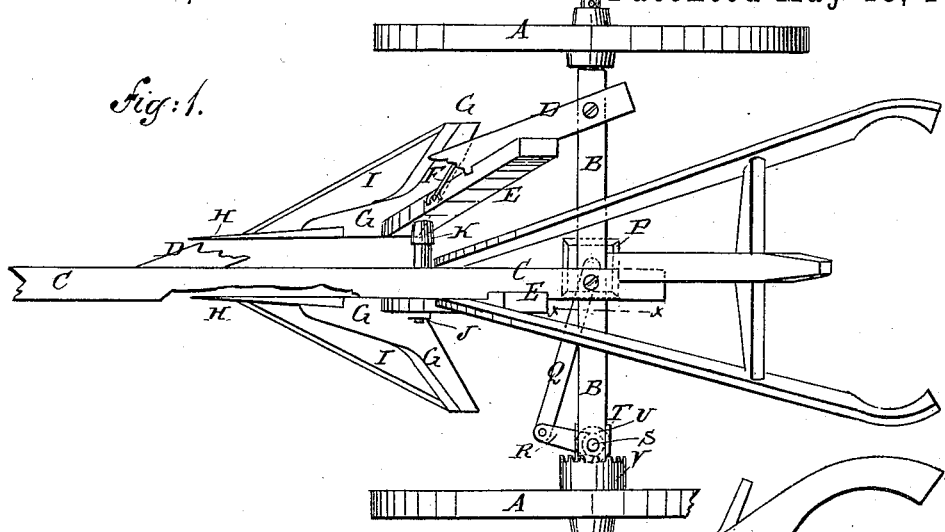
Fig: 1.
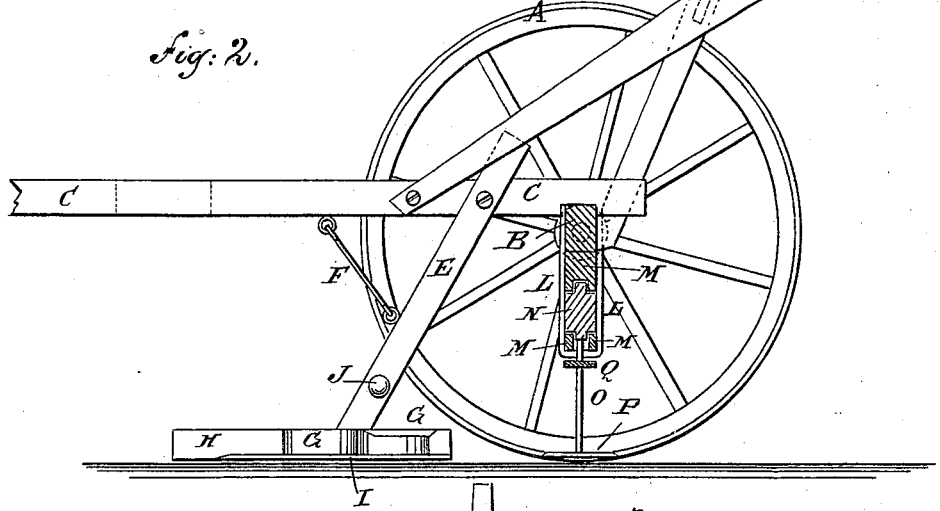
Fig: 2.
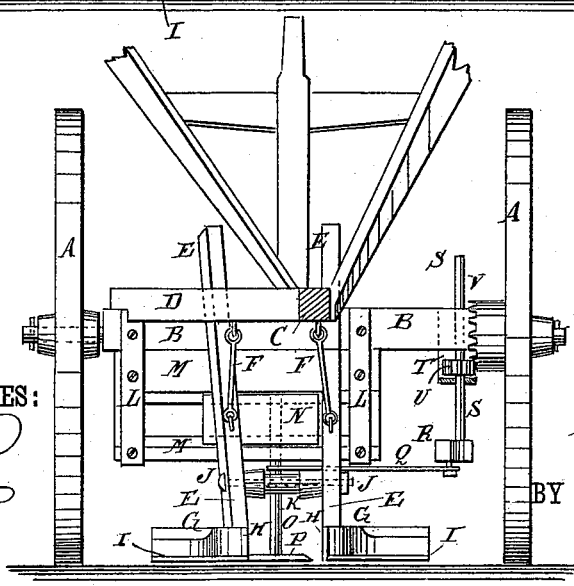
Fig: 3.
WITNESSES:
Chas. Nida
C. Sedgwick
INVENTOR:
C. J. Morrison
BY Munn & Co
ATTORNEYS.

United States Patent Office.

COLUMBUS JOHNSON MORRISON, OF HAWTHORN, FLORIDA.

COMBINED COTTON SCRAPER AND CHOPPER.

SPECIFICATION forming part of Letters Patent No. 298,491, dated May 13, 1884.

Application filed December 22, 1883. (No model.)

*To all whom it may concern:*

Be it known that I, COLUMBUS J. MORRISON, of Hawthorn, Alachua county, Florida, have invented a new and Improved Combined Cotton Scraper and Chopper, of which the following is a full, clear, and exact description.

Reference is to be had to the accompanying drawings, forming part of this specification, in which similar letters of reference indicate corresponding parts in all the figures.

Figure 1 is a plan view of my improvement, parts being broken away. Fig. 2 is a side elevation of the same, partly in section through the line $x$ $x$, Fig. 1. Fig. 3 is a front elevation of the same, the beams being shown in section.

The object of this invention is to facilitate the scraping and chopping of cotton-plants in bringing them to a stand.

The invention consists in the construction, arrangement, and combination of parts, as will be hereinafter fully described, and specifically set forth in the claims.

A are the wheels, to the middle part of the axle B of which is bolted the rear end of the beam C. The beam C is strengthened in position by the brace D, the rear end of which is bolted to the end part of the axle B, and its forward end is bolted to the side of the beam C.

To the beam C and brace D are bolted the upper ends of two standards, E, which are strengthened against the draft-strain by the braces F. The lower ends of the braces F are connected by eyebolts or staples with the standards E, and their upper ends are connected by eyebolts or staples—one with the beam C and the other with the brace D.

To the lower ends of the standards E are bolted the feet G, the forward arms of which are parallel with each other and with the line of draft. The rear arms of the feet G incline outward and rearward at an obtuse angle, as shown in Fig. 1.

To the forward parts of the forward arms of the feet G are secured by bolts or screws the points or cutters H, which are made thin and with sharp forward ends, and are placed edgewise, as shown in Fig. 1, to cut the crust of the soil and any roots or weeds that may cross the row of plants, and thus prevent the soil from being torn away from the roots of the plants, and the consequent injury of the plants.

To the lower sides of the outer parts of the feet G are secured by bolts or screws thin plates I, the outer edges of which are made sharp, project beyond the said feet, and incline rearward and outward, to shave or scrape off the top soil and the grass and weeds growing therein and reduce the row of plants to the desired width. The lower parts of the standards E are connected by a bolt, J, and are kept at the desired distance apart by nuts or a tubular washer, K, so that the said standards E and the shoes G can be readily adjusted wider apart or closer together, as may be desired, so as to bring the row of plants to the desired width. With this construction, the feet G can be made of iron and the cutters H and shears I of steel, so as to lessen the cost of manufacture, and should one of the said parts be broken or otherwise injured, it can be readily replaced by a new one without its being necessary to buy an entire new foot.

To the lower side of the axle B is secured, by straps L or other suitable means, a frame, M, within which slides a block, N.

To the block N is attached the upper end of a vertical rod, O, to the lower end of which is attached a chopping-plate or hoe, P.

To the block N or rod O is attached the inner end of a connecting-rod, Q, the outer end of which is pivoted to a crank-arm, R, attached to the lower end of the vertical shaft S. The shaft S revolves in bearings in the axle B and in the strap T, attached to the said axle, and to the said shaft is attached a small gear-wheel, U, the teeth of which mesh into the teeth of the gear-wheel V, attached to the inner end of the hub of the drive-wheel A, so that as the machine is drawn forward the hoe P will be moved back and forth successively across the row of plants, describing a zigzag path, and leaving stalks for a hill between the successive strokes. With this construction, as the machine is drawn forward, the cutters and shears H I scrape or bar off the sides of the row of plants and reduce the said row to the desired width, and the hoe P chops the said row to a stand.

Having thus described my invention, I claim as new and desire to secure by Letters Patent—

1. In a combined cotton chopper and scraper, the standards E, connected together near their lower ends by the bolt J, tubular washer K on said bolt between the standards, the feet G on the lower ends of said standards, and the removable cutters H and scrapers I, secured to said feet, substantially as set forth.

2. In a combined cotton scraper and chopper, the combination, with the axle B and wheel A, of the frame M, the sliding block N, the rod and hoe O P, and the connecting-rod Q, crank-shaft R S, and gear-wheels U V, substantially as herein shown and described, whereby the said hoe will be operated from the said drive-wheel, as set forth.

COLUMBUS JOHNSON MORRISON.

Witnesses:
J. D. McCraw,
H. A. Morrison.